No. 813,433. PATENTED FEB. 27, 1906.
F. G. JOHNSON.
VALVE GEAR.
APPLICATION FILED MAY 25, 1905.

Witnesses

Frank G. Johnson, Inventor.

by C A Snow & Co
Attorneys

UNITED STATES PATENT OFFICE.

FRANK G. JOHNSON, OF ELKADER, IOWA.

VALVE-GEAR.

No. 813,433.  Specification of Letters Patent.  Patented Feb. 27, 1906.

Application filed May 25, 1905. Serial No. 262,239.

*To all whom it may concern:*

Be it known that I, FRANK G. JOHNSON, a citizen of the United States, residing at Elkader, in the county of Clayton and State of Iowa, have invented a new and useful Valve-Gear, of which the following is a specification.

This invention relates to valve-gears, and has for its object to provide certain new and useful improvements in this class of devices so as to particularly adapt the same for use in connection with traction-engines, although it is of course apparent that the gear may be used in other relations.

A particular object of the invention is to materially reduce the number of elements of the gear and to have the same compactly arranged, and also to obtain a direct action upon the slide-valve with the use of a single eccentric.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
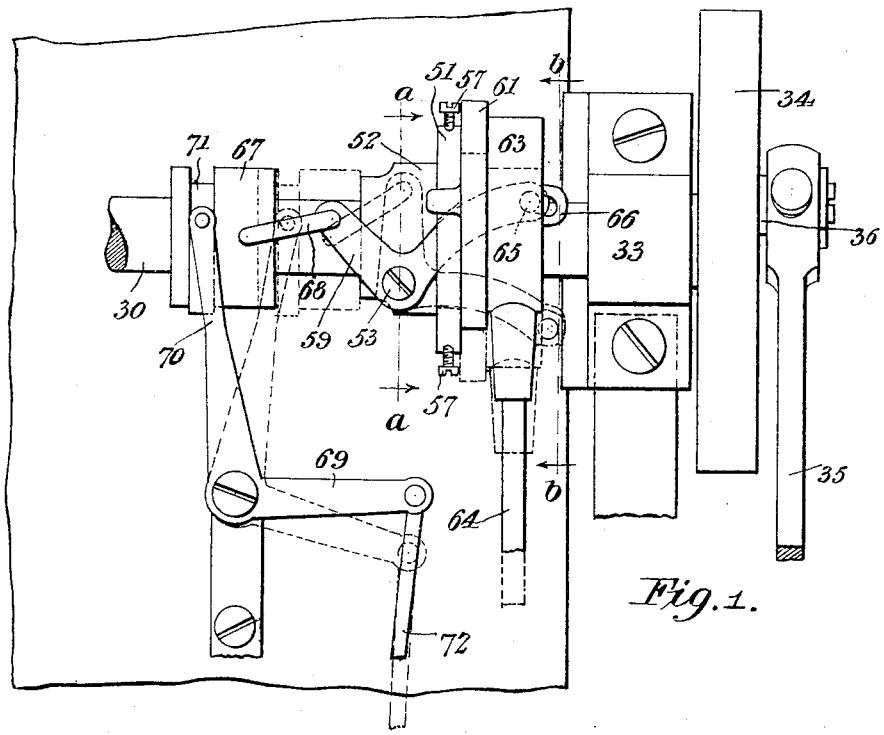
Figure 2:
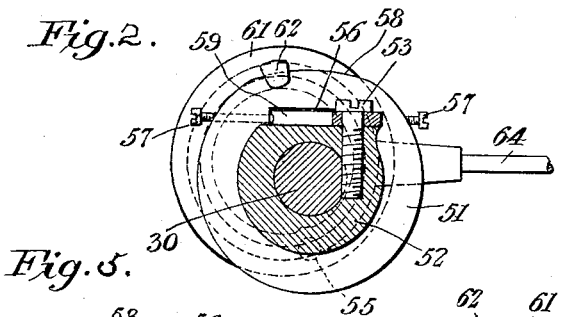
Figure 3:
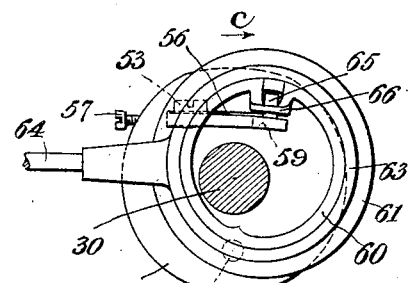
Figure 5:
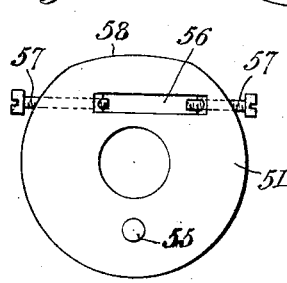
Figure 4:
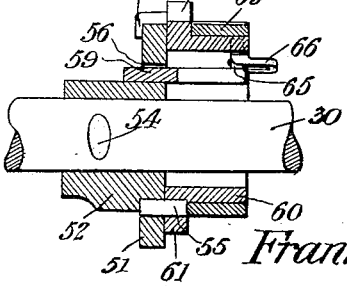

In the drawings, Figure 1 is a plan view of the valve-gear of the present invention. Fig. 2 is a sectional view on the line $a\ a$ of Fig. 1. Fig. 3 is a sectional view on the line $b\ b$ of Fig. 1. Fig. 4 is a sectional view on the line $c\ c$ of Fig. 3. Fig. 5 is a detail view of the collar for the support of the eccentric.

Like characters of reference designate corresponding parts in all of the figures of the drawings.

In Fig. 1 of the drawings there has been shown a suitable support 1—for instance, the top of the boiler of a traction-engine—upon which is mounted a drive-shaft 30, having one end portion mounted in a suitable bearing 33, through which the shaft projects, and has its terminal provided with a crank-disk 34, to which a pitman-rod 35 is connected in the usual manner by a wrist-pin 36. Upon the shaft 30 is a collar 51, which has a hub 52, embracing the drive-shaft 30 and fixed thereon by means of a screw or other fastening 53, which pierces the hub and engages a seat or flattened portion 54 (shown in Fig. 4) in one side of the shaft 30. At one side of the center of this collar is a fixed laterally-directed pin or projection 55, and diametrically opposite the pin is a slot 56, the opposite ends of the slot being pierced by set-screws 57, having their heads accessible at the outer periphery of the collar, whereby the screws may be adjusted to shift the positions of their inner ends in the slot, and thereby vary the available length of the latter. Adjacent the slot and between the set-screws the outer peripheral edge of the collar has a portion 58 struck from the pin or projection 55 as a center. Upon the hub 52 there is a bell-crank lever 59, which is fulcrumed upon the fastening 53 and has its longer arm working through the slot 56 in the collar 51. At the pin or projection side of the fixed collar 51 there is an eccentric-ring 60, embracing the shaft and pivotally supported adjacent its periphery upon the pin 55, so as to swing back and forth upon the latter to change its eccentric relation with respect to the shaft 30. This eccentric-ring is provided with an annular flange 61, lying adjacent the collar 51 and pierced by the projection 55, said flange carrying a laterally-directed hook 62, slidably embracing the peripheral portion 58 of the fixed collar 51. An eccentric-strap 63 loosely embraces the eccentric-ring 60 and is provided with an eccentric-rod 64, that is in turn connected to the slide-valve. (Not shown.) That arm of the lever 59 which passes through the slot 56 of the fixed collar 51 works within the eccentric-ring 60 and is provided with a pin or projection 65, working in a slotted ear 66, carried by the inner side of the eccentric-ring and projected at the outer edge thereof.

The means for actuating the bell-crank lever 59 includes a cylindrical slide 67, mounted upon the shaft 30 to rotate therewith and connected to the adjacent arm of the bell-crank lever 59 by a suitable link 68. In rear of the shaft 30 there is a bell-crank lever 69, having one arm 70 forked and engaged with an annular groove or channel 71 in the slide 67, there being a connecting-rod 72 extending between the other arm of the bell-crank lever 69 and a suitable reversing-lever. (Not shown.)

To reverse the engine, the reversing-lever is moved so as to swing the bell-crank lever 59, whereby the eccentric-ring 60 will be shifted upon its pivotal support 55 and the eccentric-strap 63 shifted either forwardly or rearwardly, and through the medium of the eccentric-rod 64 the slide-valve will be shifted by a direct pull, and the engine thereby reversed.

Having thus described the invention, what is claimed is—

1. The combination of a shaft, a collar fixed thereon and provided with a slot and an eccentric peripheral portion, an eccentric embracing the shaft and pivoted upon the collar opposite the eccentric portion thereof, said eccentric having a hook slidably embracing the eccentric portion of the collar, and a lever fulcrumed upon the shaft and working in the slot of the collar in connection with the eccentric to shift the latter upon its pivotal support.

2. The combination of a shaft, a collar fixed thereon and provided with a slot, an eccentric embracing the shaft and pivotally supported upon the collar, a lever working in the slot of the collar in connection with the eccentric, and a set-screw piercing one end of the slot in the collar to limit the play of the lever.

3. The combination of a shaft, a collar fixed thereon and provided with a slot, limiting-screws piercing the opposite ends of the slot, an eccentric pivoted upon the collar, and a lever working in the slot in connection with the eccentric to shift the latter upon its pivotal support, the play of the lever being limited by the screws.

4. The combination of a shaft, a collar embracing the shaft and having a hub projected at one side of the collar and fixed to the shaft, the collar being provided with a slot and an eccentric peripheral portion, a lever fulcrumed upon the hub and working through the slot, and an eccentric pivoted upon the other side of the collar in connection with the lever and provided with a hook slidably embracing the eccentric portion of the collar.

In testimony that I claim the foregoing as my own I have hereto affixed my signature in the presence of witnesses.

FRANK G. × JOHNSON.
his mark

Witnesses:
   E. L. PARTCH,
   G. E. DAVIS,
   GEO. FAGAN.